July 24, 1934.　　　G. A. PARKINS　　　1,967,625
OPTICAL DEVICE
Filed April 13, 1933　　3 Sheets-Sheet 1
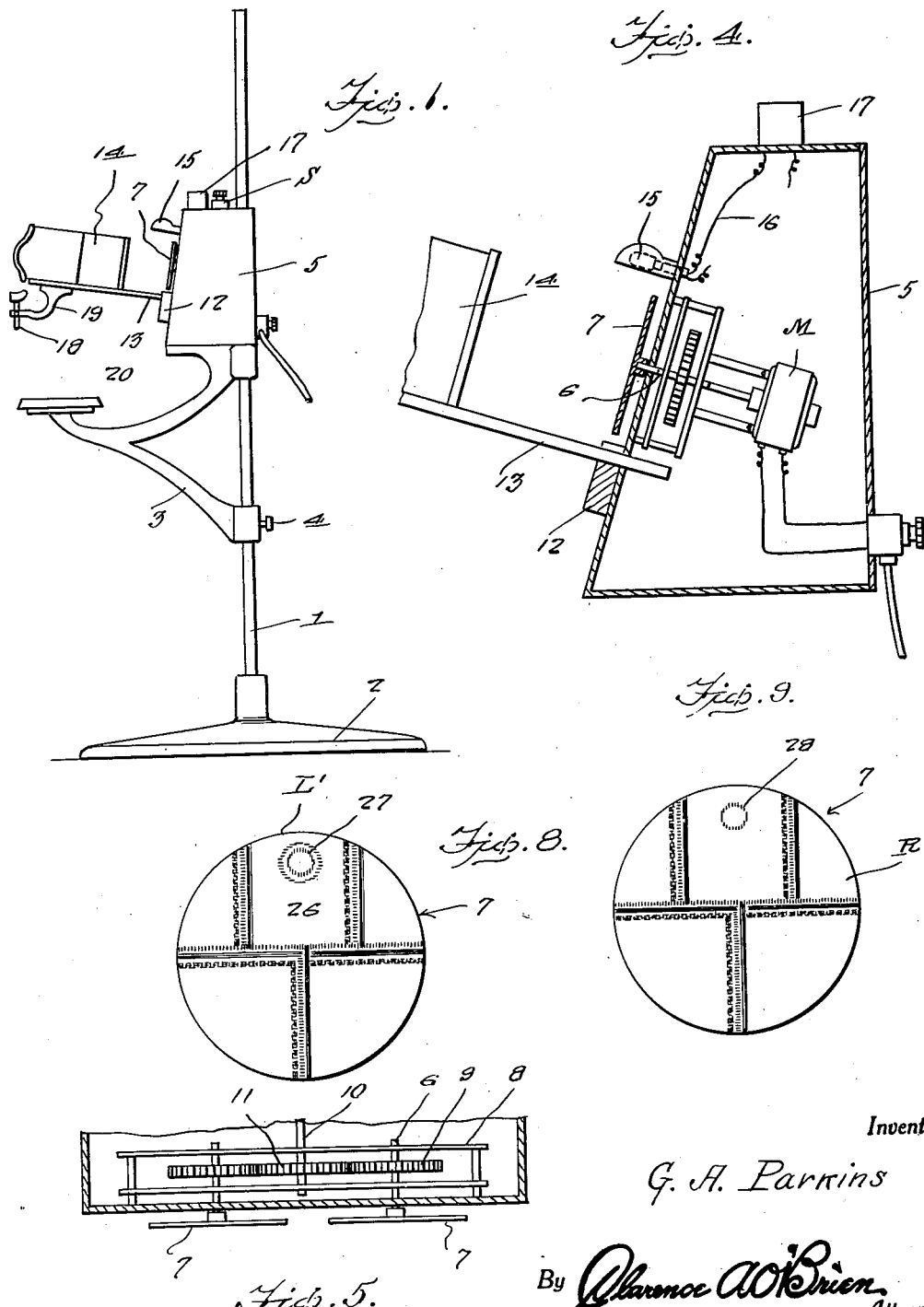
Inventor
G. A. Parkins
By Clarence A. O'Brien
Attorney July 24, 1934. G. A. PARKINS 1,967,625
OPTICAL DEVICE
Filed April 13, 1933 3 Sheets-Sheet 2
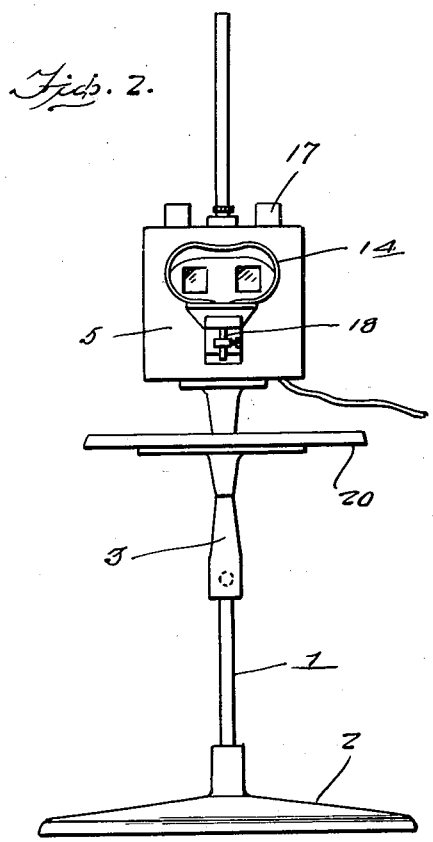
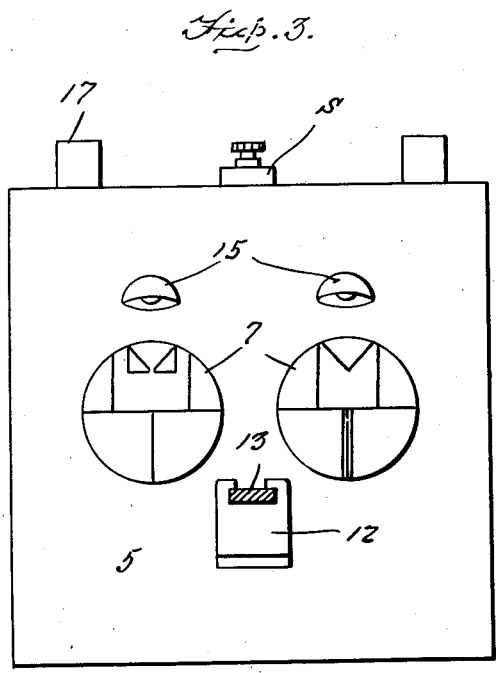
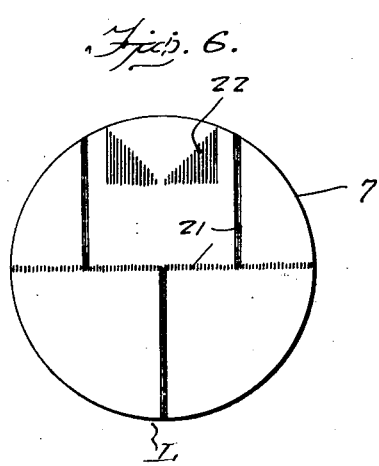
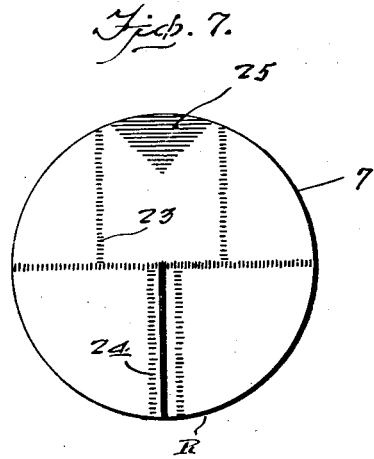
Inventor
G. A. Parkins
By Clarence A. O'Brien
Attorney July 24, 1934.　　　　　G. A. PARKINS　　　　1,967,625
OPTICAL DEVICE
Filed April 13, 1933　　　3 Sheets-Sheet 3
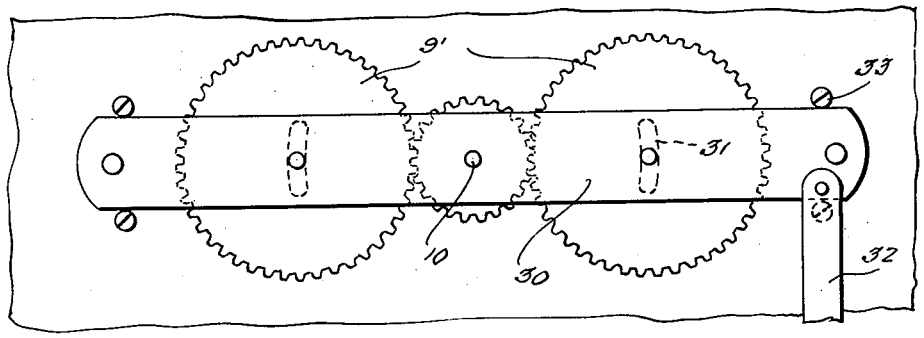
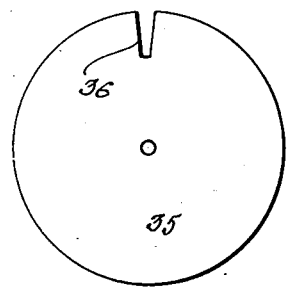
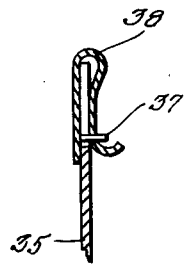
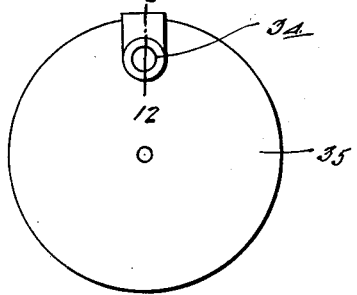
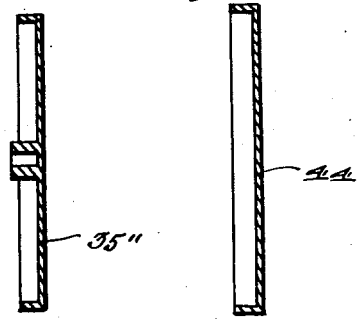
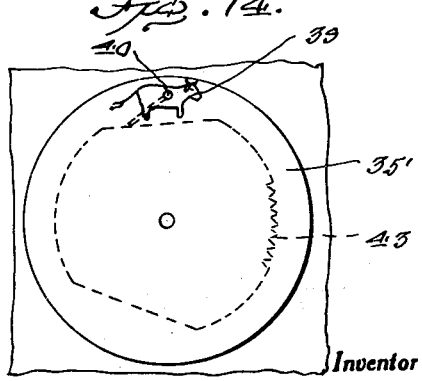
Inventor
G. A. Parkins
By Clarence A. O'Brien
Attorney Patented July 24, 1934

1,967,625

UNITED STATES PATENT OFFICE 1,967,625

OPTICAL DEVICE

George A. Parkins, Ord, Nebr.

Application April 13, 1933, Serial No. 666,026

3 Claims. (Cl. 128—25)

This invention relates to an optical device, the general object of the invention being to provide means for treating the eyes to improve and remedy various defects of sight; to improve, strengthen and develop vision, binocular single vision, and depth perception; and to improve, strengthen and develop the muscles of accommodation and convergence and integrated, reciprocal, synergistic innervation of the extra-ocular and intra-ocular muscles of the human eye.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a side view of a device constructed in accordance with this invention.

Figure 2 is a front view thereof.

Figure 3 is a front view of the casing, with the stem of the stereoscope in section.

Figure 4 is a vertical sectional view through the casing.

Figure 5 is a fragmentary horizontal section through the casing, showing the gearing.

Figure 6 is a view of one of the rotary disks.

Figure 7 is a view of the other disk.

Figures 8 and 9 are views of two other disks.

Figure 10 is a fragmentary view looking toward the inner face of the casing and showing means for raising and lowering the target carrying disks.

Figure 11 is a view showing a disk provided with a notch for receiving an adjustable target.

Figure 12 is a section on line 12—12 of Figure 13.

Figure 13 is a view of the disk with the target thereon.

Figure 14 is a fragmentary view showing a disk provided with a movable target.

Figure 15 is a horizontal sectional view through a part of the casing and showing the disk and target shown in Figure 14.

Figure 16 is a sectional view of a cup-shaped disk.

Figure 17 is a view of the cup-shaped cover adapted to be placed on the disk shown in Figure 16.

In these drawings, the numeral 1 indicates a standard attached to a base 2 and the numeral 3 indicates a bracket adjustably supported on the standard, such as by means of a set screw 4. A casing 5 is supported at the top of the bracket and a pair of shafts 6 is rotatably arranged in the front part of the casing and a disk 7 is fastened to the outer end of each shaft. The inner ends of the shafts are journaled in a frame 8 supported in the casing and the inner part of each shaft has a gear 9 attached thereto. A shaft 10, driven by a motor M, is journaled in the frame 8 and has a gear 11 thereon which meshes with the two gears 9, as clearly shown in Figure 5, so that the two disks rotate in the opposite directions.

A bracket 12 is supported on the front of the casing for supporting the shank 13 of a stereoscope 14, the front of the casing having an opening therein through which the shank 13 passes, as shown in Figure 4.

Lamps 15 are supported from the front of the casing which are provided with reflectors, for illuminating the disks and the circuits 16 of these lamps are controlled by the rheostats 17 which are controlled by the switch S.

The bracket 12 slidably supports the stereoscope so that it can be adjusted toward and away from the disks and an adjustable chin rest 18 is carried by a bracket 19 attached to the stereoscope and the bracket 3 supports an arm rest 20.

Thus it will be seen that a person looking through the stereoscope will see the images of any suitable type on the rotating disks and as shown in Figures 6 and 7 and 8 and 9, the images or designs on the disks can be varied as desired. For instance, Figure 6 shows a disk for the left eye which is formed with the horizontal and vertical lines 21 and the triangles 22 of red color, while the disk shown in Figure 7, is formed with the horizontal and upper lines 23 and the three lower vertical lines 24 and the figure 25. This figure 25 and the vertical lines 23 are of blue color, as are the outer vertical lines 24. The horizontal line 23 and the center vertical line 24 are red. When these two targets or disks are superimposed with the stereoscope, a single view of the two targets is seen with two vertical lines 21 of the left hand disk outside of the two vertical blue lines 23 of the right disk and two red triangles 22 adjoining the figure in blue shown at 25 in Figure 7.

In Figures 8 and 9, a left disk is shown at L' and the right at R' and each disk has the vertical and horizontal lines 26 thereon, each of which has outer bands colored red and yellow and a center band of blue. The left hand disk has a double circle 27, the inner part of which is red and the outer part blue, while the right disk has but a single circle 28 in red.

The disk L' is used for suspending eye and the disk R' for dominant eye. The double circle 27 forms a target for the suspending eye and the single circle 28 forms a target of fixation of dominant eye.

It will be seen that when the disks are superimposed with the stereoscope, fixating targets will be red until vision awakens in suspending eye. Radiating colored lines are for awakening peripheral vision which in turns awakens central vision.

It will, of course, be understood that various disks can be provided for use with the apparatus, the disks being provided with different designs or targets and the disks can be removably attached to their shafts so that one set of disks can be easily removed and another set substituted therefor.

Any suitable means can be used for rotating the disks and they can be provided with means whereby they can be rotated in opposite directions or in either direction and means may be provided whereby the disks can be adjusted as to the distance between them or moved up or down.

The disks may also be arranged in the casing and windows provided whereby they can be observed through the stereoscope and the targets may be made to move on the disks.

As will be seen, the essential part of this invention relates to the two rotating disks used as a chart for the stereoscope and the invention has a variety of uses for the development of the visual functions, and the training of the extraocular and intra-ocular muscles, as set out in the following paragraphs.

If the stereoscope is set at the focal length of its lenses and the attention of the patient directed to the fixation targets, near the periphery of the disks, the eyes will move in unison in a circular direction, as the disks are rotated, developing all the extra-ocular muscles, stimulating the circulation of blood through the eye and its appendages, bringing them nourishment and carrying away the wastes much more rapidly than normal.

Since the various disks have additional designs, aside from the fixation targets near their periphery, the movement of the disks with the eyes following the fixation target, these designs will stimulate peripheral vision, broaden the field of vision and stimulate a more active central vision.

Some of the pairs of disks will have part of the design on one disk and part on the other disk so that the full attention of each eye must be active at all times if the whole pattern is to be seen, as the image of the one disk is superimposed upon the other disk as viewed through the stereoscope.

Negative accommodation and positive convergence can both be stimulated by moving the stereoscope out beyond the focal length of the lenses.

Positive accommodation and negative convergence can be stimulated by bringing the stereoscope closer to the targets than the focal length of the lenses, while the full attention of the eyes is held by the moving fixation targets.

Positive accommodation and positive convergence may both be stimulated by bringing the stereoscope closer to the targets than the focal length of the lenses and using additional base out prism in the stereoscope, as desired by the operator.

The attention of the eyes will be held much better and much more rapid progress will be made in the successful treatment by the use of the rotating disks, than with still targets.

Negative accommodation and negative convergence can both be stimulated by withdrawing the stereoscope beyond the focal length of its lenses and inserting additional base in prisms in the stereoscope. Here again the moving targets will be of material assistance in holding the visual attention and much more rapid progress will be made than with still targets.

The stereoscope lenses may also be stationary and the positive accommodation stimulated by inserting suitable concave lenses in front of the stereoscope; negative accommodation may be stimulated by inserting convex lenses in the stereoscope; convergence may be stimulated by inserting base out prisms and negative convergence may be stimulated by the use of base in prisms in like manner.

Stereoscope may be made similar to Figure 1, but with lenses fixed in position and the whole enclosed with suitable lamps to illuminate the disks.

Suitable additional mechanism may be made to alternately turn the lights on or off.

Since it has been found that amblyopic eyes are more sensitive to certain colors, as well as more sensitive to movement, disks are supplied with designs in these colors, suitably arranged to awaken peripheral vision and thus stimulate central vision.

Crossed eyes:

Since the deviating eye, either inturning or outturning, usually suppresses or is amblyopic, vision is first awakened in the deviating eye by setting the stereoscope at such distance that will give the deviating eye the best vision, stimulate the desire for vision in this eye, then use the weakest prism that will superimpose the one image over the other and continue treatments, gradually reducing the prism power as the eye will permit, then reversing the prisms and treating until the eyes function normally.

Figure 10 shows means for adjusting the disks up or down, such means comprising an elongated plate or frame 30 which carries the shafts and gears 9' and the frame is pivoted on the power shaft 10' and the casing is formed with the slots 31 through which the disk carrying shafts pass, so that the frame 30 can be rocked on the shaft 10 to raise one disk and lower the other or vice versa through means of any suitable means or by hand. Such means are connected with the frame 30 by a link 32. Screws or the like, shown at 33, can be inserted in parts of the casing to hold the frame 30 stationary, as shown in Figure 10.

Figures 11, 12 and 13 show a removable and adjustable target 34 on a disk 35, said disk being formed with a notch 36 for receiving the pin 37 which is carried by the clip 38 of spring material which carries the target. Thus the target can be easily removed from the disk and another one substituted therefor, and the target can be adjusted relative to the disk.

Figures 14 and 15 show a movable target 39 on a disk 35', this target having its pivot pin 40 passing through the disk and bent to provide a dog 41 which will engage an irregularly shaped plate 42 attached to the casing and which is formed with the teeth 43. Thus as the disk rotates, the dog will engage the irregularly shaped edges and the teeth 43 of the plate 42 so that the target 39 will be moved and thus cause the eyes to follow its movement.

Figures 16 and 17 show a disk 35″ of cup shape to receive a second cup-shaped member 44 so that this member 44 can be easily and quickly placed on the member 35″ and removed therefrom so that another member 44 can be substituted therefor. Various designs or targets can be placed on the members 44 and that member having the desired design or target thereon is placed on the member 35″. If desired, the disks or the members 44 can be provided with suitable guideways to receive sectional targets so that the various sections can be changed, as desired.

It will, of course, be understod that the disks themselves are to be interchangeable, so that they should be detachably connected to their shafts, but by providing the members 44, the disks can be firmly attached to the shafts and the members 44 changed as desired.

While the drawings show a motor M for driving the disks, it will be understod that various means can be used for driving them and they can be rotated in the same direction or in opposite directions and at various speeds.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A device for treatment of the eyes, comprising a pair of spaced disks, each having thereon an eccentrically arranged target, a stereoscope for viewing the disks, and means for rotating the disks in unison as they are being viewed through the stereoscope.

2. A device for treatment of the eyes, comprising a pair of spaced disks, each having thereon an eccentrically arranged target, a stereoscope for viewing the disks, means for rotating the disks in unison as they are being viewed through the stereoscope, and each disk having designs thereon of various colors.

3. A device for treatment of the eyes, comprising a pair of spaced disks, a stereoscope for viewing the disks, means for rotating the disks in unison as they are being viewed through the stereoscope, each disk having an eccentrically arranged target thereon arranged adjacent a part of the periphery of the disk, and means for imparting movement to the target as the disk rotates.

GEORGE A. PARKINS.